Aug. 30, 1949.　　　　E. D. STASSEN　　　　2,480,202
BATTERY HOLDER
Filed Feb. 10, 1948
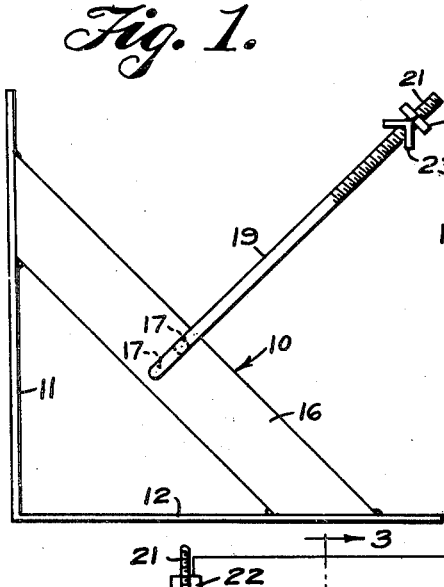
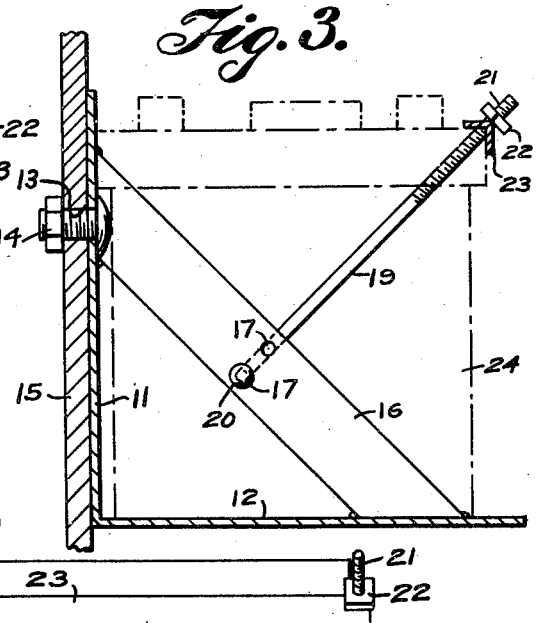
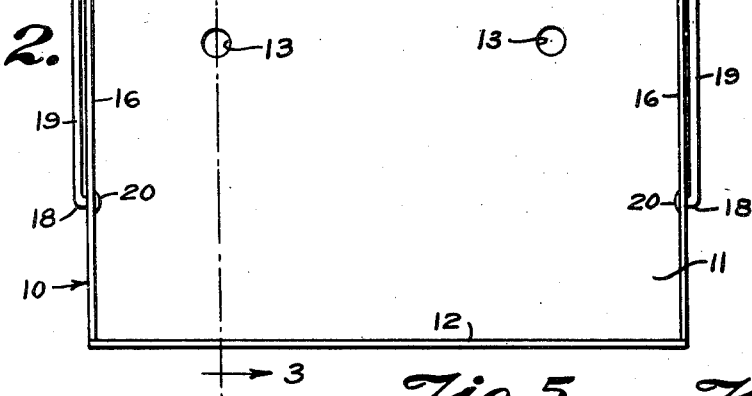
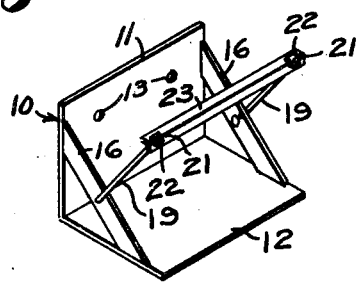
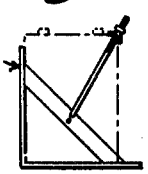
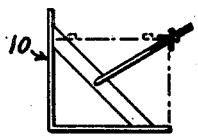
INVENTOR.
*Elmer D. Stassen*
BY *Victor J. Evans & Co.*
ATTORNEYS Patented Aug. 30, 1949

2,480,202

UNITED STATES PATENT OFFICE 2,480,202

BATTERY HOLDER

Elmer D. Stassen, Wanatah, Ind.

Application February 10, 1948, Serial No. 7,507

2 Claims. (Cl. 180—68.5)

This invention relates to a support holder for automobile batteries or similar batteries, and more particularly to a support that is susceptible of being mounted on the dash, frame or running board of an automobile.

An object of the invention is to provide a support which will securely hold a battery in proper position, but will permit easy and quick removal of the battery when necessary.

The support is designed to protect the portion of the automobile to which it is attached, from the corrosive action caused by the fumes emanating from the battery or the spillage of the acid within the battery.

The support comprises a few simple parts, and is adjustable for various heights of batteries, and made of a predetermined size, will fit batteries of the same size or smaller batteries.

With the above and other objects and advantages in view, the invention consists of the novel details of construction, arrangement or combination of parts more fully hereinafter described, claimed and illustrated in the accompanying drawing in which:

Figure 1 is an end, elevational view of an embodiment of the invention;

Figure 2 is a front, elevational view of the battery support;

Figure 3 is a sectional view on the line 3—3 of Figure 2, showing a representation of a battery in dotted lines, in place on the support;

Figure 4 is a perspective view of the battery holder.

Figure 5 is an end elevational view of the device in use with a long narrow battery shown in dotted lines and Figure 6 is a similar view in use with a short wide battery shown in dotted lines.

Referring more in detail to the drawing, the reference numeral 10 is used to generally designate the support for a battery embodying the invention.

The support comprises the vertical mounting plate 11, and a horizontal battery supporting plate 12. The plate 12 being positioned at right angles to the plate 11, and integral therewith, forms a substantially L-shaped support or holder.

The plate 11 is provided with spaced openings 13, which are in the same horizontal plane extending longitudinally of the plate 11. Bolts 14 entering the openings 13 will secure the support or holder to the portion of an automobile where it is desired to mount the holder. The portion 15 shown in Figure 3 may represent the dash or frame of an automobile.

Should the portion 11, however, be placed on a flat surface of an automobile, such as the running board, the battery can still be supported in its proper vertical position.

Secured at their approximate ends to the plates 11 and 12, are the inclined side or bracing bars 16, which are provided with alined spaced openings 17 to receive the hooked ends 18 of the holding bolts 19. The hooked ends being upset at 20 to prevent disengagement of the hooked ends from the openings 17 in the side bars 16.

The opposite ends of the bolts 19 are threaded in the conventional manner at 21 to receive the nuts 22.

Slidably mounted on the bolts 19, is the V-shaped cross-bar 23, which is used to retain the battery 24 in position on the support when the nuts 22 are tightened, as shown in Figure 3.

In use, the plate 11 is fixed to the automobile in any position desired.

The support is fixed as to the length of the largest battery it will hold, but it will hold batteries of lesser length.

By inserting the bolts in the openings 17 when in a horizontal position, batteries of various heights can be accommodated by using the lower or top openings 17. The cross-bar is then placed on the bolts 19, and positioned on the upper edge of the battery and the nuts 22 tightened.

The batteries will then be held securely in position, but can be easily removed, by merely loosening the nuts 22.

While the support has been described as being used with an automobile, it can be used on boats, tractors, airplanes or anywhere that a battery of this type needs to be safely and adequately supported.

It is believed that from the foregoing description, the structure and use of the support or holder will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A support or holder for a battery of the type described comprising an L-shaped body having a horizontal plate portion and a vertical plate portion, a pair of side bars connected at their opposite ends to the opposite ends of said plates at an inclined relation thereto, a pair of aligned spaced openings in each said side bars, centrally and transversely thereof, bolts with hooked ends positioned with a hook end of each bolt in one of the openings of one of the side bars, said hooked ends of the bolts being upset, thereby retaining the bolts in the openings of the side bars, a cross bar carried by the bolts and positioned to engage an upper edge of a battery on the horizontal plate of said body, and means carried by the bolts to retain said cross bar in fixed engagement with the battery.

2. In a battery support, the combination which comprises an L-shaped body having a horizontally disposed plate and a vertically disposed plate with diagonally disposed brace bars connecting the ends of the plates, said bars having openings therein intermediate of the ends thereof, a pair of bolts pivotally mounted in the openings of said bars, a cross bar positioned to engage the upper end of the battery on the said horizontally disposed plate carried by the bolt, the outer end of said bolt being threaded and having a nut threaded thereon.

ELMER D. STASSEN.

REFERENCES CITED

The following references are of record in the file of this patent:

UNITED STATES PATENTS

| Number | Name | Date |
| --- | --- | --- |
| 1,621,176 | Sonin | Mar. 15, 1927 |
| 2,009,199 | Pohotsky | July 23, 1935 |
| 2,435,463 | Pettingill | Feb. 3, 1948 |